Jan. 6, 1925.  
F. J. RIPPL  
GLASS CUTTING APPARATUS  
Filed Nov. 6, 1919  
1,522,271
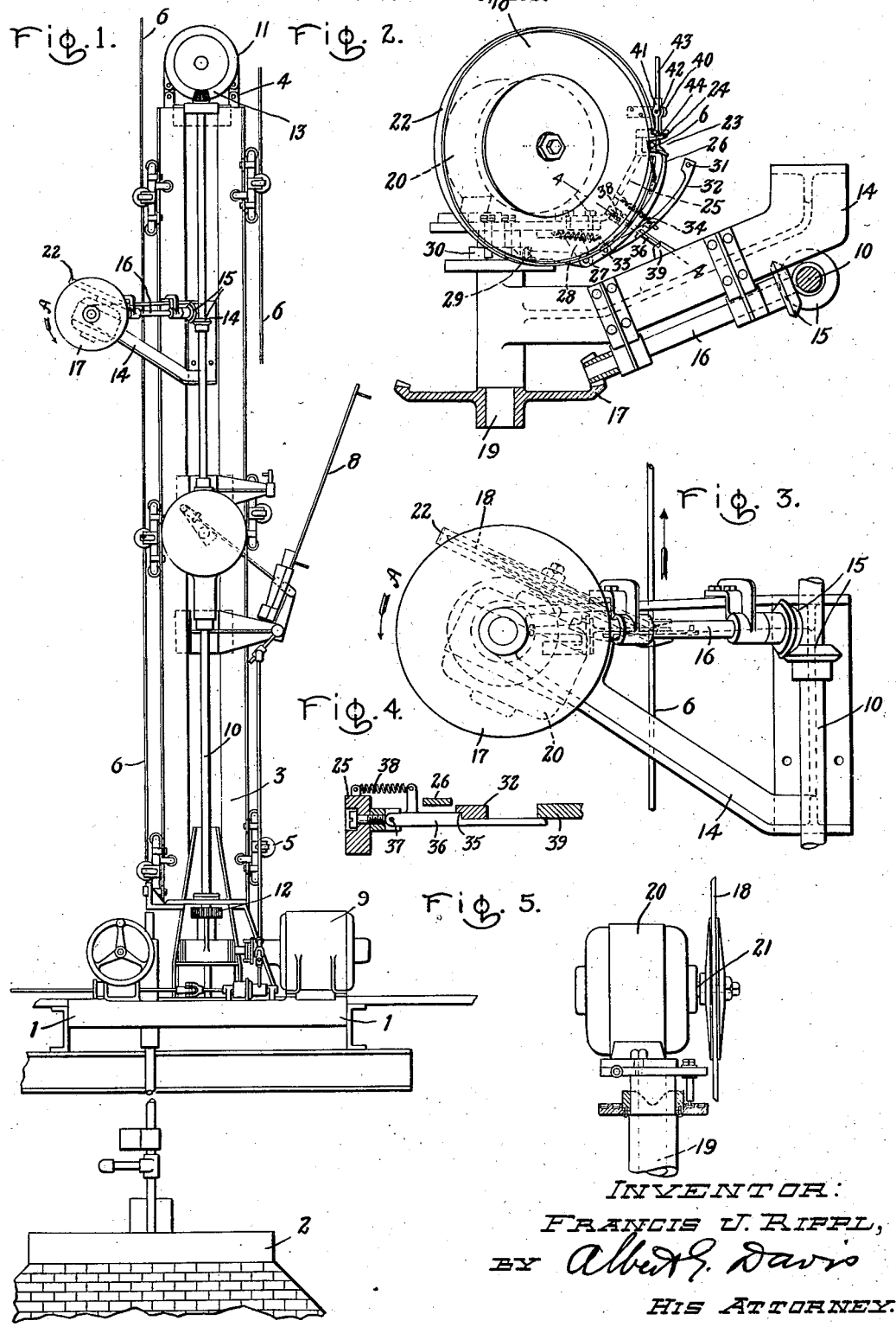
INVENTOR:
FRANCIS J. RIPPL,
BY Albert G. Davis
HIS ATTORNEY.

Patented Jan. 6, 1925.

1,522,271

UNITED STATES PATENT OFFICE.

FRANCIS J. RIPPL, OF CLEVELAND, OHIO, ASSIGNOR TO GENERAL ELECTRIC COMPANY, A CORPORATION OF NEW YORK.

GLASS-CUTTING APPARATUS.

Application filed November 6, 1919. Serial No. 336,064.

*To all whom it may concern:*

Be it known that I, FRANCIS J. RIPPL, a citizen of the United States, residing at Cleveland, in the county of Cuyahoga, State of Ohio, have invented certain new and useful Improvements in Glass-Cutting Apparatus, of which the following is a specification.

My invention relates to apparatus for cutting cane glass and glass tubing and has special application in connection with apparatus for drawing cane glass and glass tubing particularly of the type set forth in the Fagan Patents Numbers 1,273,345 and 1,273,346 although not limited in use thereto. The object of my invention is to improve glass cutting apparatus whereby the cane and glass tubing may be cut more accurately.

The machine of the Fagan patents embodies a continuous vertically disposed conveyor with gripping and drawing devices attached thereto at suitable intervals. This machine, while efficient in drawing cane glass and tubing, has some difficulty in properly cutting the lengths of cane or tubing. The cutting mechanism severs the cane or tubing leaving what may be termed a ragged edge. This is undesirable as there results a certain amount of waste due to the rough edges of the cane or tubing, furthermore the cutting means described in the above patents when applied to severing glass tubing has the disadvantage that when the knives come together with a sharp impact, the glass chips or splinters and small particles of glass fall into the tubing, making it lumpy and unfit for use. Pieces of glass also lodge in different parts of the machine, clogging certain mechanisms and often making a complete overhauling of the machine necessary. I have substantially obviated these difficulties with my improved cutting apparatus which cuts glass tubing just as well as cane glass and does away with practically all waste caused by ragged edges.

My invention will be more clearly understood by reference to the accompanying drawing in which Fig. 1 is a side elevation of a cane and tube glass drawing machine having attached thereto my improved cutting apparatus; Fig. 2 is an enlarged plan view of my improved cutting apparatus; Fig. 3 is a side elevation of the same; Fig. 4 is an enlarged view of crack-off arm mechanism on the section line 4—4 of Fig. 2; Fig. 5 is a view of the motor and cutting wheel.

Referring now to the drawings, a base 1 is mounted above a container 2 containing therein molten glass, and upon the base 1 is mounted a vertically disposed standard 3 over which runs a continuous conveyor or carrier 4 on sprockets mounted on the forked ends of the standard. The carrier 4 has mounted at suitable intervals thereon gripping or drawing devices 5 which in their upward movement on the conveyor are caused to grip and draw upwardly the cane glass or glass tubing 6 and after the cane or tube sections are detached by the detaching device hereinafter described carry the detached sections up over the uppermost end of the standard and deliver them during their downward journey to any suitable receiving means such as the delivery arms 8.

The base 1 carries a motor 9 which through a vertically disposed countershaft 10 drives the uppermost sprocket 11 causing the continuous operation of the chain carrier 4. The motor 9 drives the vertical shaft 10 through the intermediate gearing 12 and the shaft 10 drives the upper sprocket 11 through the gearing 13 one of the latter intermeshing gears being mounted on shaft 10 and the other on the overhanging end of the shaft of sprocket 11.

The standard 3 carries near to its upper end a bracket 14 which supports the cutting apparatus. The cutting apparatus is driven from the vertical shaft 10 through gearing 15 countershaft 16 and gearing 17. The frame which carries the cutting wheel 18 and driving mechanism therefor, is mounted on shaft 19 which is held by bracket 14. Shaft 19 is driven by the gearing 17 in the direction of the arrow A (Figs. 1 and 4). The cutting apparatus as a whole is driven in synchronism with the chain conveyor 4 and the vertical driving shaft 10 by means of the countershaft 16.

The cutting wheel 18 is preferably made of carborundum or other abrasive material and is driven by motor 20 which is carried by shaft 19 on the opposite end from the gearing 17.

The motor 20 is directly connected to the cutting wheel 18 through shaft 21. A guard 22 surrounds the cutting wheel 18, said guard has an opening at 23 and in the opening 23 is a V-shaped part 24 which is carried by the motor frame arm 25 and which acts as a guide for the cane and glass tubing. As the cane or tubing is drawn through the guide 24 and just before it is marked or scored by the cutting wheel an arm 26 which moves in synchronism with the cutting wheel motor frame comes in contact with the cane or tubing as shown in Fig. 2 so as to hold it against the cutting wheel during the cutting process. The arm 26 is pivoted at 27 to a bracket 28 which is fastened to the base of the motor 20. The arm 26 has attached to its end a roller 29 which rides on cam 30 attached to the bracket 14. After the cane glass has been scored by the cutting wheel a pin 31 carried by the crack-off arm 32 which is pivoted to arm 26 at 33, is brought into contact with arm 26 with a slight impact by the action of spring 34 fastened to the arm 32 and the frame arm 25 to insure the separation of the glass should it not break immediately after being scored by the wheel 18. As shown in Figs. 2 and 4, the crack-off arm 32 is normally held against the shoulder 35 of the arm 36 pivoted to the frame arm 25 at 37. A spring 38 fastened to the arm 36 and the frame arm 25 normally holds the arm 36 against the arm 32 until the arm 36 strikes the projecting pin 39 fastened to the bracket 14 in the path of the arm 36 which causes the arm 36 to release the crack-off arm 32. The cam 30 through the roller 29 withdraws arms 26 and 32 from the V-shaped opening 24 thus giving clearance to the cutting mechanism to continue in the direction of rotation A imparted to it by the motor 9 as previously described and also permitting the shoulder 35 of the arm 36 to engage the crack-off arm 32.

It will be apparent from the above description that, after the severance of the cane or tubing, the action of the cam 30 on the roller 29 causes the arm 26 and the arm 32, which is in contact therewith, to be forced out of line with the path of travel of the cane or tubing and to such positions that the shoulder 35 engages the shoulder on the arm 32. Subsequently when the cutting wheel has been rotated again into operative position, the cam 30 causes the arm 26 to move inwardly so that its end rests against the cane or tubing opposite the scoring point. The arm 32 is prevented from following the arm 26 by the arm 36 which is still in engagement with it. However, the end of arm 36 next comes in contact with the pin 39 thus releasing the arm 32 which is thereupon moved rapidly by a spring 38 to strike a hammer blow on the arm 26.

After the cutting wheel has been used for a certain length of time it is preferable to resharpen it. To this end I have attached to guard 22 a bracket 40 which carries a wheel dressing or sharpening means 41 which is pivoted to bracket 40 at 42 and has at its upper end a handle 43 and at its lower end a member 44. When the handle 43 is pulled to the right the member 44 rides on the wheel 18. This operation puts a new edge on the cutting wheel.

Various modifications of the above described apparatus will readily suggest themselves to those skilled in the art and are to be considered as coming within the scope of my invention which is set forth in the appended claims.

What I claim as new and desire to secure by Letters Patent of the United States, is:—

1. The combination of means for scoring cane glass or glass tubing, means for holding said cane or tubing against said scoring means, and means for rotating said scoring and holding means into operative relation with said cane or tubing.

2. The combination of means for scoring cane glass or glass tubing, means for holding said cane or tubing against said scoring means, means for cracking off said cane or tubing and means for rotating said scoring, holding and cracking off means into operative relation with said cane or tubing.

3. The combination of means for scoring cane glass or glass tubing while moving, means for causing said scoring means to move in synchronism with said cane or tubing, means for holding said cane or tubing against said scoring means and means for rotating said scoring and holding means into operative relation with said cane or tubing.

4. The combination of means for scoring cane glass or glass tubing while moving, means for causing said scoring means to move in synchronism with said cane or tubing, means for holding said cane or tubing against said scoring means, means for cracking off said cane or tubing and means for rotating said scoring, holding and cracking off means into operative relation with said cane or tubing.

5. The combination with an abrasive wheel, means for rotating said abrasive wheel to score cane glass or glass tubing, means for holding said cane or tubing against said abrasive wheel said means comprising a guide, an arm to engage said cane or tubing to hold it in said guide, means for causing said arm to engage said cane or tubing and means for causing said arm to disengage said cane or tubing and means for cracking-off said cane or tubing said means comprising an arm having a pin therein and means for causing said pin to deliver an impact to said engaging arm after said cane or tubing has been scored by said abrasive wheel of means for feeding said cane or tubing into operative relation with said abrasive wheel, holding and cracking off means.

6. The combination with an abrasive wheel, means for rotating said abrasive wheel to score cane glass or glass tubing, means for causing said abrasive wheel to move in synchronism with said cane or tubing, means for holding said cane or tubing against said abrasive wheel said means comprising a guide, an arm to engage said cane or tubing to hold it in said guide, means for causing said arm to engage said cane or tubing and means for causing said arm to disengage said cane or tubing and means for cracking off said cane or tubing said means comprising an arm having a pin therein and means for causing said pin to deliver an impact to said engaging arm after said cane or tubing has been scored by said abrasive wheel of means for feeding said cane or tubing into operative relation with said abrasive wheel, holding and cracking off means.

7. The combination of means for scoring cane glass or glass tubing, means for holding said cane or tubing against said scoring means, comprising a guide, an arm to engage said cane or tubing to hold it in said guide, means for causing said arm to engage said cane or tubing and means for causing said arm to disengage said cane or tubing, means for cracking off said cane or tubing and means for rotating said scoring, holding and cracking off means into operative relation with said cane or tubing.

8. The combination of means for scoring cane glass and glass tubing, means for holding said cane or tubing against said scoring means, means for cracking off said cane or tubing comprising an arm having a pin therein, means for causing said pin to deliver an impact to said holding means and means for rotating said scoring, holding and cracking off means into operative relation with said cane or tubing.

9. The combination with means for causing the rectilinear travel of glass cane or tubing of a support carrying a cutting wheel and driving means therefor, means for rotating said support about an axis transverse to the path of travel of said cane or tubing so as to bring said cutting wheel into and out of operative relation to said cane or tubing at regular intervals, and means whereby a proper time relation is secured between the speed of said support rotating means and that of the means for causing the travel of said cane or tubing.

10. The combination with means for causing the rectilinear travel of glass cane or tubing of a support carrying a cutting wheel and driving means therefor, means for rotating said support means so as to bring said cutting wheel into and out of operative relation to said cane or tubing at regular intervals, means brought into operation by said rotation for bracing said cane or tubing during the scoring thereof by said cutting wheel, and means whereby a proper time relation is secured between the speed of said supporting rotating means and that of the means for causing the travel of said cane or tubing.

11. The combination with means for causing the rectilinear travel of glass cane or tubing of a support carrying a cutting wheel and driving means therefor, means for rotating said support means so as to bring said cutting wheel into and out of operative relation to said cane or tubing at regular intervals, means brought into operation by said rotation for bracing said cane or tubing during the scoring thereof by said cutting wheel, means also brought into operation by said rotation for striking said cane or tubing after said scoring, and means whereby a proper time relation is secured between the speed of said supporting rotating means and that of the means for causing the travel of said cane or tubing.

In witness whereof, I have hereunto set my hand this 3rd day of November, 1919.

FRANCIS J. RIPPL.